March 19, 1963  R. S. SHREWSBURY  3,081,805
INDEXING SYSTEM

Filed Jan. 20, 1960  2 Sheets-Sheet 1

INVENTOR
ROBERT S. SHREWSBURY

BY *Cushman, Darby & Cushman*
ATTORNEYS

March 19, 1963 R. S. SHREWSBURY 3,081,805
INDEXING SYSTEM
Filed Jan. 20, 1960 2 Sheets-Sheet 2
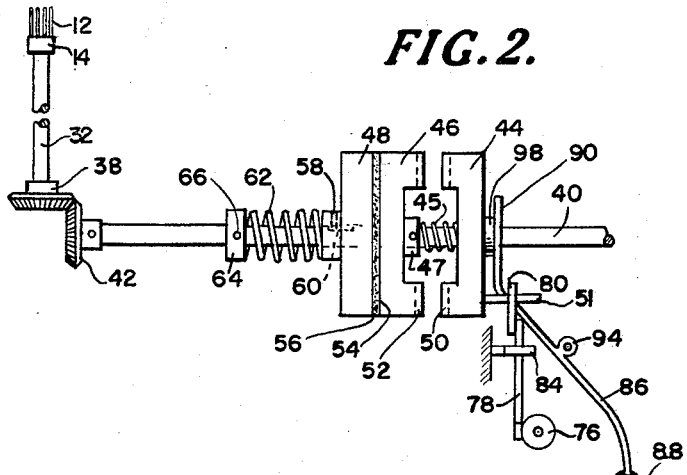
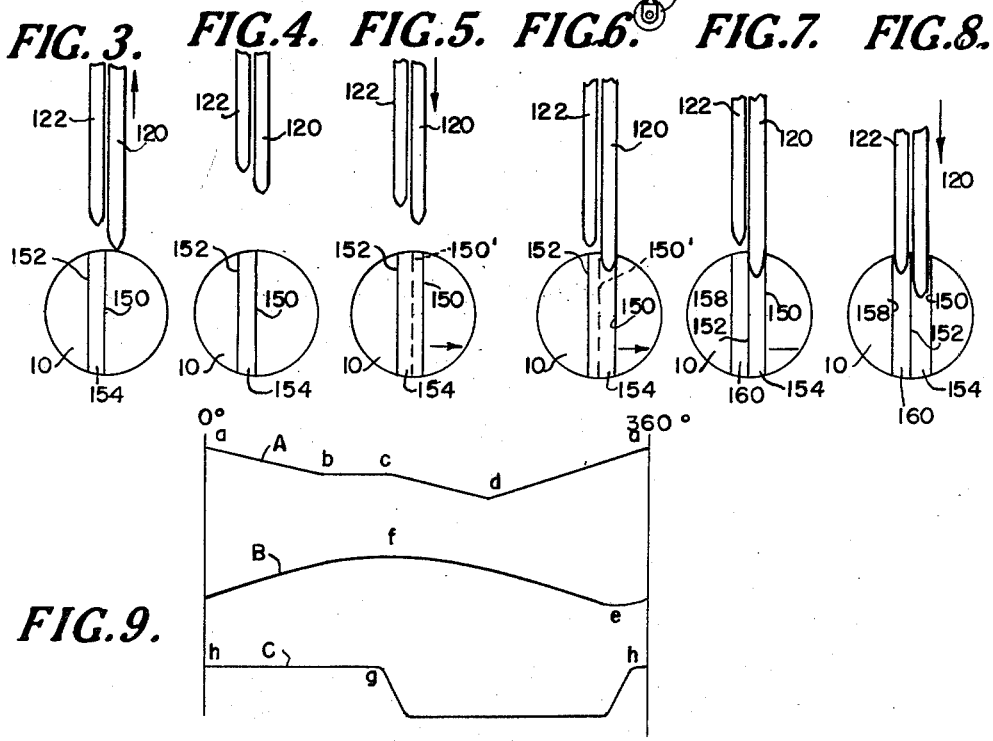
INVENTOR
ROBERT S. SHREWSBURY
BY *Cushman, Darby & Cushman*
ATTORNEYS 3,081,805
INDEXING SYSTEM
Robert S. Shrewsbury, Dunedin, Fla., assignor to Vic-Mar Corporation, Dunedin, Fla., a corporation of Florida
Filed Jan. 20, 1960, Ser. No. 3,526
8 Claims. (Cl. 146—3)

This invention relates to indexing and more particularly to an indexing system for indexing consecutive chambers, compartments or sections of articles past an operating station.

In the illustrated embodiment of the invention, to be described in detail hereinbelow, the invention is shown as being applied to the indexing of peeled citrus fruits, such as grapefruit. While the invention is particularly applicable for this purpose, it will be appreciated that it may be used for indexing other articles having a plurality of adjacent chambers, compartments or sections.

As is well known, citrus fruits are composed of a number of generally wedged-spaced sections of juice bearing pulp which are separated by membranes which extend radially from the core of the fruit. In addition, there is an external membrane which surrounds all of the sections, and covering it is an outer layer known as the peel, which defines the outer surface of the fruit. Such fruits widely vary in size and shape, and have varying size sections, as well as a widely differing number of sections. This is particularly true among different types of fruit, but even in a single fruit the size of the individual sections will also vary considerably, both in the radial direction and in the included angle of each section. The substantial variation in size and shape of the sections of one fruit itself or with respect to sections in another fruit of the same type, or of a different type fruit, makes the sectionizing of citrus fruits difficult. There is disclosed in my co-pending application No. 727,185, now Patent No. 3,030,995, however, mechanical means for satisfactorily removing the sections of citrus fruit by the use of fluid cutting jets.

One of the more serious problems in connection with the automatic sectionizing of citrus fruits has been that of indexing the fruit to present a new section or sections to the sectionizing or operating station.

It is therefore a primary object of the present invention to provide a novel indexing system of the type referred to and particularly adapted for indexing the consecutive sections of a citrus fruit past an operating or sectionizing station, such as, for example, that disclosed in my co-pending application. A related object is to design such an indexing system so that each section to be removed will be automatically located at the sectionizing station, regardless of the size of the fruit and the size and shape of each individual section therein.

It is another object of the present invention to provide an indexing system for indexing the consecutive sections of a citrus fruit past a fixed position, wherein citrus fruits of any size or shape may be used, and yet accurate positioning may still be achieved.

It is yet another object of the present invention to provide a novel method of indexing consecutive sections of a citrus fruit past a sectionizing station.

A still further object of the present invention is to provide a simple and practical apparatus for indexing consecutive sections of a citrus fruit past a sectionizing station for practicing the novel method of indexing.

According to the preferred form of the invention, the indexing system is constructed to impart a rotary indexing movement to the citrus fruit and indexing tools are utilized to provide for accurate location of the respective fruit sections. The indexing tools may be of such design that they sectionize the fruit as well as function as part of the indexing system. These tools preferably are constructed as a pair of elongated members wherein one terminates closer to the fruit than the other. This latter relationship is an important feature of the invention to insure accurate indexing irrespective of the size and shape of the individual fruit sections. However, it is not essential that these indexing tools be designed to sectionize also, it being fully within the scope of the present invention to use additional and separate tools for the sectionizing function.

These and other objects of the present invention will become apparent from consideration of the present specification taken in connection with the accompanying drawings in which I have shown a single embodiment of my invention by way of example, and wherein:

FIGURE 2 is a side elevational view of a portion of the apparatus shown in FIGURE 1, illustrating the indexing apparatus;

FIGURES 3 through 8 illustrate the consecutive steps of the method of indexing employing the principles of the present invention; and FIGURE 9 is a graph illustrating the respective exemplary profiles of the cams used in the present apparatus.

Figure 1:
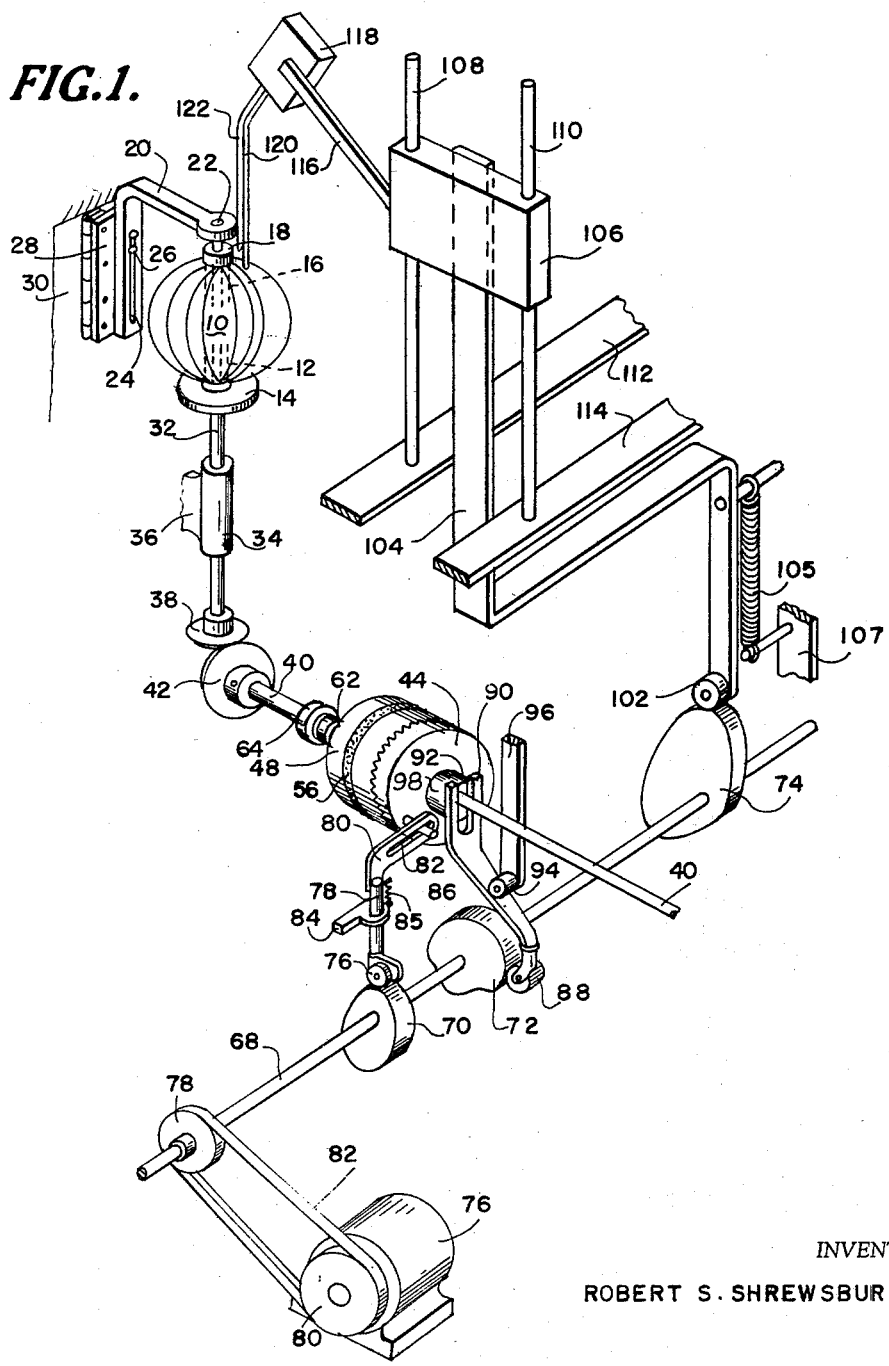
FIGURE 1 is a perspective view of a sectionizing apparatus employing an indexing system embodying the principles of the present invention.

Referring more particularly to the drawings, there is shown in FIGURE 1 an apparatus for sectionizing citrus fruit which includes the indexing system of the present invention. The citrus fruit which is to be sectionized is indicated at 10, and is supported in a conventional manner by means of tines 12 which are mounted upon the project upwardly from a lower support member 14 into fruit 10. The fruit 10 is additionally held in position by means of tines 16 which are affixed to an upper support member 18 and project downwardly into the fruit. Upper support member 18 is rotatably mounted upon a mounting bracket 20 by means of shaft 22. Mounting bracket 20 is provided at its outward, downwardly extending end with slot 24 which receives in a sliding relationship supporting pin 26 which is mounted upon hinge member 28. As can be seen, mounting bracket 20 is so mounted that it may be raised and lowered, and in addition may be pivoted away from the axis of the fruit 10 by means of hinge member 28 which is affixed to a wall or other stationary support 30 which forms part of the machine frame (not shown). When it is desired to remove the fruit 10 from the support means, bracket 20 may be raised to lift the tines 16 from the fruit, whereupon it may be lifted off of tines 12. If desired, of couse, the bracket 20 may be pivoted out of the way by means of hinge member 28. To place the fruit upon the supporting means this procedure may be reversed.

Lower support member 14 is shown rigidly connected to a shaft 32 rotatably supported in a journal 34 which is in turn secured to a frame portion of the apparatus by means of a web 36. Shaft 32, which serves to rotate and index the fruit 10, is provided at its lower end with bevel gear 38.

The main indexing shaft is indicated at 40 and can be best seen by reference to FIGURES 1 and 2. Provided at one end of indexing shaft 40 in a fixed relation thereto is a bevel gear 42 which is in meshing engagement with the bevel gear 38 for driving shaft 32. Also mounted upon index shaft 40 is the drive means for indexing this shaft, which comprises sliding drive gear 44, driven gear 46 and clutch member 48. Sliding drive gear 44 is rotatably and slidably mounted upon index shaft 40 in any suitable manner and is provided with axially directed teeth 50 about the periphery of one side face thereof, and with a laterally extending drive pin 51 projecting from the other face thereof. Adjacent sliding drive gear 44 is disposed a driven gear 46 similar to drive gear 44 and which is also rotatably and slidably mounted on the indexing shaft 40 in any conventional manner. To limit the sliding movement of driven gear 46 in one direction there is provided a stop collar 47 on shaft 40, rigidly secured thereto. Driven gear 46 is provided with axially extending teeth 52 which are similar to teeth 50 and are adapted to engage therewith. Driven gear 46 is also provided with a flat rear face 54. Disposed between gears 44 and 46, about shaft 40, is a compression spring 45 for biasing the two gears apart and out of engagement.

Clutch member 48, which is provided on one face with friction surface material 56, is mounted upon indexing shaft 40 in such a manner as to rotate therewith and yet be capable of sliding axially thereon, as by means of a set screw 58 and elongated keyway 60. Set screw 58 does not engage the bottom of keyway 60, but simply extends into the keyway to prevent relative rotation between clutch member 48 and index shaft 40, while allowing for a sliding movement therebetween. Clutch member 48 normally engages the rear face 54 of driven gear 46, and is biased to such a position by means of clutch spring 62 which is maintained in a compressed position by means of adjustable collar 64. Adjustable collar 64 is rigidly secured to index shaft 40 by means of a screw 66 and is adapted to be adjusted along shaft 40 to vary the compression of clutch spring 62, to thereby vary the torque necessary to cause clutch member 48 to slip upon the rear face 54 of driven gear 46. As can be seen, FIGURE 2 shows the gears in a disengaged relationship. Although a friction clutch is shown, any type of clutch would be satisfactory. For example, a magnetic coupling which drives partly by magnetic force and partly by friction may be used.

In FIGURE 1, there is shown a main drive shaft 68 having rigidly but adjustably mounted thereon drive cam 70, indexing cam 72 and sectionizing cam 74. Drive shaft 68 is rotated at a constant continuous speed, when the apparatus is being operated, by any conventional means as, for example, motor 76 acting through pulleys 78 and 80 and belt 82.

Drive cam 70 serves to periodically rotate or oscillate sliding gear drive 44 in opposite directions. As can be seen, drive cam 70 is provided with a cam follower 76 which is rotatably attached to cylindrical linkage member 78, which is in turn provided at its upper end with a drive link 80 having a slot 82 therein. Slot 82 is adapted to receive driving pin 51 so that as the link 80 is raised and lowered by means of drive cam 70 the driving pin 51 will similarly be raised and lowered to thereby rotatably oscillate sliding drive gear 44, as can be seen. Linkage member 78 is slidably supported within a stationary support member 84 which is rigidly attached to a convenient portion of the apparatus frame, and is provided with a follower spring 85 attached to support member 84 for maintaining follower 76 in positive contact with cam 70.

Indexing cam 72 is adapted to slide continuously oscillating drive gear 44 into and out of engagement with driven gear 46. For this purpose, there is provided linkage member 86 having a roller follower 88 rotatably secured to one end thereof, and provided at its opposite end with bifurcated end portion 90, defining a slot 92. Linkage member 86 is shown pivoted intermediate its ends by means of an integral boss 94 which is rotatably secured to a stationary brace 96 which forms a part of the frame of the apparatus. The slot 92 of linkage member 86 is so disposed as to receive therein index shaft 40, to thus enable the bifurcated end portion 90 to engage a hub 98 which forms a part of sliding drive gear 44. Spring 45 serves to bias the sliding drive gear 44 against linkage 86 to thereby maintain follower 88 in positive contact with cam 72. Drive cam 70 and indexing cam 72 are so arranged that the sliding drive gear 44 will be pushed into engagement with driven gear 46 by means of linkage member 86 during the time interval the drive gear 44 is oscillating in the forward or indexing direction, which in FIGURE 1 is the clockwise direction. Shaft 68 is also adapted to rotate in the clockwise direction.

As can be seen, when linkage member 86 pushes sliding drive gear 44 into engagement with driven gear 46 both gears 44 and 46, clutch member 48 and shaft 40 will all rotate together as a unit, unless resistance is encountered, causing clutch 48 to slip.

Sectionizing cam 74 is provided with a follower 102 which is rotatably secured to the lower end of a linkage member 104, rigidly secured at its upper end to a slide block 106. To maintain the follower 102 in positive contact with cam 74 at all times there is provided a follower spring 105, connected at one end to the linkage member 104 and at the other end to a stationary member 107 forming a part of the frame (not shown). Disposed at each end of slide block 106 are vertical apertures for receiving guide rods 108 and 110, respectively, to thereby guide the slide block 106 for vertical movement. Guide rods 108 and 110 are rigidly secured to stationary members 112 and 114, respectively, which form a part of the frame of the apparatus. Extending upwardly and outwardly from slide block 106 and affixed thereto is support arm 116 which has secured at its outer end tool mounting means 118. Tool mounting means 118 serves to mount long and short tools 120 and 122, respectively, in a position wherein they may be disposed close to the core of the fruit 10, as can be seen. As slide block 106 is reciprocated in the vertical direction by means of sectionizing cam 74 the tools 120 and 122 are similarly reciprocated in the vertical direction. Tool 120 is designed to operate as a stop for the indexing movements of the fruit, as will become more apparent as the description proceeds.

Reference to FIGURE 9 will illustrate an exemplary set of profiles which may be used with cams 70, 72, and 74. The profile of sectionizing cam 74, which serves to raise and lower the sectionizing tools 120 and 122, is indicated by curve A. As can be seen, the position in which the tools are fully retracted above the fruit is indicated at $a$. Moving to the right, the tools are lowered from $a$ to $b$, whereupon they dwell without any vertical movement from $b$ to $c$. The cam and follower linkage should be so adjusted that the long tool 120 has just entered the fruit 10, as for example one-half to three-quarters of an inch with citrus fruits, when the dwell position is reached. At the end of the dwell the tools then pass downwardly through the fruit as is indicated between $c$ and $d$. At position $d$ both of the tools are at their fully extended or lower position, lowered with the free end of each tool protruding from the bottom of the fruit. From $d$ back to $a$ the tools are raised through the fruit to their fully retracted position at $a$. As is apparent, the maximum displacement of cam 74 may be varied to any suitable value, depending on the distance which it is desired to extend the tools through the fruit, which distance depends on the type of tools being used, as will be more fully described hereinafter.

The profile of oscillating cam 70, for rotatably oscillating sliding drive gear 44 is indicated at B. The profile B of cam 70 is so designed that the gear will be continuously oscillating, first rotating in a forward indexing direction and then in a reversed direction. Reading profile B from left to right, it will be observed that from $e$ to $f$ the sliding drive gear 44 will be rotated in the forward indexing direction, while from $f$ to $e$ it will be rotated in the reverse direction.

Curve C indicates the profile of indexing cam 72 for selectively engaging the sliding drive gear 44 with driven gear 46 whenever the sliding drive gear is being rotated in the forward indexing direction. As can be seen, while sliding drive gear 44 is being rotated in the indexing direction, between $e$ and $f$, it will be moved into engagement with the driven gear 46 by means of linkage 86, responsive to the profile of cam 72 from *h* to *g*, moving to the right. The portion of the profile of cam 72 between *g* and *h* causes the sliding drive gear 44 to be moved to the unengaged position during the interval it is being oscillated in the reversed direction, between points *f* and *e* on curve B.

A more detailed description of the function of profiles A, B, and C with respect to the method of indexing will be found hereinbelow. However, it should be noted that the various profiles illustrated are simply for exemplary purposes only, and that the present invention contemplates the use of many different cam profiles, or other different structures for effecting the necessary timed and coordinated movements of the work holder and tools 120, 122, as would be apparent to one skilled in the art.

The method of indexing may be most clearly seen by reference to FIGURES 3 through 8. Each one of these figures shows, somewhat diagrammatically, the peeled fruit 10, the long tool 120 and the short tool 122, but at different positions in the indexing cycle. In FIGURE 3, fruit 10 is shown provided with membranes 150 and 152 defining a section 154. As can be seen, the fruit 10 is adapted for rotational or indexing movement about the vertical axis extending through its central core. Furthermore, the fruit will be arranged so that tools 120, 122 will be disposed on either side of membrane 150 as shown in FIGURE 3. In the position which is shown in this figure, the fruit 10 is not indexing and the tools 120 and 122 are being retracted from the fruit 10, for example, after having passed all the way therethrough. This position occurs between points *d* and *a* on the profile curve A of cam 74, shown in FIGURE 9.

In FIGURE 4 the fruit 10 and tools 120 and 122 are shown substantially in position *a* on curve A in FIGURE 9, which may be regarded as the beginning of the cycle. In this position the fruit is still not indexing, and the tools are at their fully retracted position. FIGURE 5 shows the fruit 10 and tools 120 and 122 moving between points *a* and *b* in FIGURE 9, wherein the tools have begun to advance towards the fruit, and the fruit has begun its rotary indexing movement. As can be seen, membrane 150 has advanced from its original position which is indicated by a dotted line 150'.

In FIGURE 6 the tools 120 and 122 have advanced to a position where the long tool 120 has contacted the fruit and extends a short distance thereinto, the indexing movement of the fruit still continuing. The position illustrated in this figure lies in the space between vertical lines extending through points *b* and *c* in FIGURE 9. As can be seen, the tools 120 and 122 dwell in this position for a period of time during which they are stationary and do not advance, while the fruit 10 is still allowed to index.

The position of the fruit 10 and the tools 120 and 122 in FIGURE 7 corresponds with points *c* and *g* in FIGURE 9. As is apparent, the tools are still in their dwell position, but membrane 152 has contacted the long tool 120. It is this contact of membrane 152 upon the tool 120 and the subsequent pressure therebetween which stops the indexing movement of the fruit 10 and breaks the driving connection between clutch 48, 56 and gear 46, whereby gear 46 will continue to rotate but clutch 48, 56 will be stationary. It can thus be seen that by initially advancing the longer tool a small amount into the fruit, and then allowing the tool itself to stop the indexing movement of the fruit when contacted by a membrane thereof, it is possible to achieve accurate positioning of the membrane 152 directly beneath the space between long tool 120, and short tool 122, regardless of the size of this section. To account for varying size sections, sufficient indexing movement should be provided for, as for example, a quarter of a revolution each indexing step. Furthermore, since the spacing between the tools 120 and 122 preferably is slightly greater than the thickness of a membrane, an adjacent section 160, defined between the membrane 152 and membrane 158, is disposed directly beneath short tool 122.

FIGURE 8 represents the portion of the cycle between both *c* or *g*, and a vertical line passing through *d* in FIGURE 9. In this position the fruit 10 is not indexing and the tools 120 and 122 are passing down through sections 160 and 154, respectively, to perform their sectionizing functions. The cycle then continues from *d* to *a* as indicated in FIGURE 9 to thereafter repeat to remove the next consecutive sections from the fruit 10.

When using the indexing method of the invention in a citrus fruit sectionizing operation it is preferred that tools 120, 122 be so constructed that, as stated, they will operate to sectionize the fruit as they pass therethrough adjacent to the core of the fruit. In this connection, these tools 120, 122 may be constructed as fluid-conveying tubular members in accordance with the teachings of my copending applications Serial Nos. 727,185, and 852,643, the disclosures of which are hereby incorporated herein by reference, so that fluid-cutting jets will issue laterally from nozzles in each tubular member and pass between the fruit section and the adjacent surfaces of the adjacent membranes. A suitable source of fluid under pressure (not shown) will be appropriately connected to the tools 120, 122 as will be understood. It will be appreciated, however, that other types of sectionizing tools may be used for freeing the fruit sections. For example, the tools 120, 122 may be provided with knife edges to do the sectionizing as the tools pass through the fruit.

In any event, it has been found to be particularly advantageous in using this invention for fruit sectionizing operations to have the tools 120, 122 so constructed and arranged that tool 120 will operate in conjunction with the indexing mechanism, as described, and both tools 120, 122 will be effective to perform sectionizing functions.

As can be seen, an important feature of the method of the invention is to provide a long sectionizing tool and a short sectionizing tool adjacent thereto, whereby both of the tools can be advanced to a position where the longer tool is in slight contact with the fruit being indexed, so that when a membrane of the fruit contacts the longer tool the indexing movement of the fruit will be stopped even though the indexing means will continue to function and tend to move or index the fruit. By utilizing this method, it is thereby possible to accurately position two separate sectionizing tools above two separate sections of fruit to be removed, regardless of the respective sizes of the sections or of the number of sections in the fruit. The diameter or width of each tool will be such as to pass between adjacent membranes adjacent the core of the fruit. In addition, the two tools must be separated by a distance at least as great as the thickness of the thickest membrane which is likely to be encountered. As a practical matter, however, almost all membranes are of substantially the same thickness. As can be seen, the collar 64 has to be adjusted so that the compression in clutch spring 62 is not too strong, but is such that when long tool 120 contacts a membrane the clutch member 48 will slip, preventing further indexing movement of the fruit. Of course the compression should not be so weak that when long tool 120 is partially inserted into the fruit, it will cause the clutch to slip before a membrane is contacted.

While the apparatus shown illustrates the shorter tool 122 disposed on the forward side of the longer tool 120, with respect to the direction of indexing movement, it would also be permissible to provide the shorter tool on the opposite side thereof.

The indexing apparatus may provide for a single indexing step of only one fruit section at a time, or for two sections at a time, whereby two sections would be removed in each complete cycle, one section by one tool and the other section by the other tool. Where a single section is indexed each step the long tool could separate the section from one side of the intermediate membrane, and the short tool separate the adjacent section from the opposite side of the intermediate membrane, whereby one section is removed during each complete cycle.

The apparatus just described illustrates merely one exemplary apparatus for carrying out the novel indexing scheme of the invention, as illustrated schematically in FIGURES 3-8. Thus, other structures for effecting the reciprocation of tools 120, 122 and the indexing movements of the article being worked on (for example, citrus fruit) in the timed relation described above may also be utilized to effect the novel indexing action represented in the sequence of steps shown in FIGURES 3-8 and explained hereinabove. Likewise, while the indexing mechanism has been shown as being connected to drive shaft 32, it may be positioned to be drivingly connected to the upper work holder and shaft 22, whereby it may then be disposed entirely or partially above the article being indexed. Differing heights of differing fruits may be compensated for, as by providing means permitting suitable adjustment of the vertical position and/or stroke and/or lengths of the tools 120, 122. If the indexing structure is arranged above shaft 22 to drive or rotate the fruit by a driving connection to shaft 22, as is also contemplated by the invention, then there should be no need for adjusting the tools 120, 122 or their strokes to accommodate fruits of differing heights. The lower support 14 in that case, may be made vertically adjustable.

Although in the system disclosed it is preferred that a dwell be provided in the motion of the sectionizing tools, during the time in which tool 120 is adapted to be contacted by one of the membranes in the fruit, it is not essential that this dwell be provided. For example, the structure may be so designed that these tools have a continuous downward movement, but wherein tool 120 will contact the fruit sometime before a membrane will rotate into contact therewith. When fruits of different heights are encountered, the stroke of the tools may be varied as should be evident. In any case, the general idea of the present invention is applied to the sectionizing of citrus fruits is to index a membrane of the fruit against the tool 120 before the other tool moves into the fruit whereby the membrane or dividing wall will then be between the tools.

There has thus been disclosed in the above description and in the drawings an exemplary embodiment of my invention; however, it will be understood by those skilled in the art that the specific details of construction and arrangement of parts, as described, are by way of example only and are not to be construed as limiting the scope of the invention. I, therefore, do not wish to be limited to the precise details set forth, and intend that the invention embody all such features and modifications as are within the scope of the appended claims.

What is claimed is:

1. Apparatus for indexing one compartment at a time of a compartmented article past a predetermined station and where said compartments may be of a varying and unpredictable size and number, comprising: article holding means; indexing means including driving means for moving said article holding means past said predetermined station; a releasable driving connection between said indexing means and the article holding means; a stop member arranged at said predetermined station; means for reciprocating said stop member into and out of compartments of the article whereby said stop member can be contacted by the trailing wall of a compartment of the article; and means for automatically releasing said releasable driving connection, said last-mentioned means being responsive to a predetermined contact pressure between said stop member and the compartment wall of the article.

2. Apparatus as defined in claim 1 wherein said stop member is of elongated configuration and further comprising a second elongated member being arranged adjacent and parallel to said stop member and means mounting said second member for reciprocation with said stop member, both of said members terminating in free ends with the free end of said stop member being disposed closer to said article than the free end of said second member whereby said stop member is the first to enter said article, and said members being arranged to enter adjacent compartments of the article.

3. Apparatus for sectionizing peeled citrus fruit having a plurality of radial sections, each separated by a radial membrane, comprising: frame means; rotatable supporting means associated with said frame means for supporting said fruit; indexing means for indexing said supporting means a fixed distance at predetermined intervals; two sectionizing tools, one of said tools being longer than the other and disposed adjacent thereto, both of said tools being mounted to reciprocate longitudinally toward and away from the fruit supported by said supporting means; drive means for reciprocating said tools; and yielding means between said indexing means and said rotatable support means and adapted to allow said indexing means to move relative to said supporting means when the longer of said tools contacts a membrane in said fruit and prevents it from indexing the full fixed distance of said indexing means.

4. Apparatus for introducing tools into an article having varying size compartments therein defined by a plurality of partitions, comprising: frame means; movable article holding means mounted on said frame means for holding an article having a plurality of compartments therein defined by a plurality of partitions; tool holding means adjacent said article holding means; means for indexing said article holding means at predetermined intervals past said tool holding means a distance greater than the distance between the partitions defining the largest single compartment in the direction of movement of said holding means; first tool means mounted in said tool holding means; second tool means mounted in said tool holding means and being disposed a distance at least as great as the thickness of each of said partitions from said first tool means, both of said tool means being mounted for reciprocatory movement towards and away from said article holding means, and said first tool means being longer than said second tool means in the direction of their movement; drive means for moving both of said tool means toward said article to a first position wherein the end of said first tool means is disposed in one of said compartments and the end of said shorter second tool means is disposed outside of said compartments, to a second position wherein both of said tool means are disposed within said compartments, and away from said article to a third position wherein both of said tool means are disposed wholly outside of said compartments; and yielding means operatively associated with said indexing means for allowing said indexing means to move relative to said article when both of said tool means are in their said first position and said first tool means is contacted by one of said partitions, whereby both of said tool means may move to their said second position with one of said tool means in a first of said compartments and the other of said tool means in a second of said compartments adjacent said first compartment.

5. Apparatus for introducing tools into an article having a plurality of partitions therein, comprising: frame means; holding means attached to said frame means for holding an article having a plurality of partitions therein; a pair of tools, one of said tools being of greater length than the other of said tools; drive means for reciprocating said tools towards and away from said holding means at predetermined intervals; indexing means for indexing said holding means and the article held thereby; and yielding means between said indexing means and said holding means for allowing said indexing means to move relative to said holding means when one of said partitions in said article contacts said longer tool.

6. A method of sectionizing peeled citrus fruit, comprising: holding said fruit in a predetermined position; indexing said fruit while simultaneously advancing together a long and a short member toward said fruit in a path perpendicular to the plane of movement of said fruit until said long member comes in contact with a membrane in said fruit; stopping the indexing movement of said fruit by the holding action of said long member on said membrane; advancing both of said members through said fruit to remove sections therefrom; and withdrawing said members from said fruit.

7. A method of sectionizing peeled citrus fruit, comprising: holding and indexing said fruit; simultaneously advancing a long sectionizing member and a short sectionizing member disposed adjacent thereto toward said fruit until said members reach a position wherein the long member contacts a membrane of said fruit and stops the indexing thereof and the short member is disposed outside of said fruit and on the other side of said membrane from said long member; and advancing said members through said fruit whereby at least one section is removed therefrom.

8. A method of indexing one section at a time of a peeled citrus fruit past a predetermined station, the sections of the fruit being separated by membranes which extend radially from the core of the fruit, said method comprising: holding said fruit in a predetermined position; indexing said fruit while simultaneously advancing a stop member toward said fruit in a path perpendicular to the plane of movement of said fruit until said member enters one compartment of said fruit and is engaged by the trailing membrane of said one section to thereby stop the indexing movement of said fruit.

References Cited in the file of this patent

UNITED STATES PATENTS

| | | |
|---|---|---|
| 1,924,392 | Barnes | Aug. 29, 1933 |
| 2,703,123 | Buck | Mar. 1, 1955 |
| 2,757,560 | Ridgeway | Aug. 7, 1956 |